United States Patent [19]
Morris et al.

[11] Patent Number: 5,983,742
[45] Date of Patent: Nov. 16, 1999

[54] RACK AND PINION STEERING DEVICE WITH SPLIT ROLLER RACK BAR SUPPORT

[75] Inventors: Christopher J. Morris, Ypsilanti; Kazuo Kato, West Bloomfield, both of Mich.; Vernon H. Bryant, Barrington, R.I.

[73] Assignee: Oiles America Corporation, Novi, Mich.

[21] Appl. No.: 09/018,863

[22] Filed: Feb. 5, 1998

[51] Int. Cl.⁶ ..................................................... B62D 3/12
[52] U.S. Cl. .............................................. 74/422; 384/58
[58] Field of Search ............................... 74/422; 384/50, 384/52, 58

[56] References Cited

U.S. PATENT DOCUMENTS

| | | | |
|---|---|---|---|
| 3,407,011 | 10/1968 | Zeidler | 384/54 |
| 3,552,805 | 1/1971 | Dunlap | 384/55 |
| 4,271,716 | 6/1981 | Carduner | 74/422 |
| 4,651,585 | 3/1987 | Donn et al. | 74/422 |
| 4,724,717 | 2/1988 | Chikuma | 74/498 |
| 4,794,809 | 1/1989 | Kobayashi et al. | 74/422 |
| 4,826,128 | 5/1989 | Schmeller | 248/669 |
| 5,058,448 | 10/1991 | Kiyooka et al. . | |
| 5,620,259 | 4/1997 | Mainardi | 384/58 |
| 5,660,078 | 8/1997 | Phillips | 74/422 |

FOREIGN PATENT DOCUMENTS 600960  11/1939  United Kingdom .

Primary Examiner—Tamara L. Graysay
Assistant Examiner—Debra A. Belles
Attorney, Agent, or Firm—Dykema Gossett PLLC

[57] ABSTRACT

A steering gear for a motor vehicle includes a housing, a rack bar, a pinion, a support yoke, a spring, a split roller, and a plurality of bearings. The rack bar is slidably supported within the housing for transverse displacement therein along an axis. The rack bar has teeth on a first side. The pinion has teeth drivingly engaging the teeth of the rack bar. The pinion is rotatably supported within the housing. Rotation of the pinion transversely displaces the rack bar along the axis. The support yoke is slidably disposed in the housing for movement toward a side of the rack bar substantially opposite the teeth of the rack bar. The support yoke has an opening which is open toward the rack bar, with the opening defining two opposed bearing surfaces. The spring is disposed between the housing and the support yoke, and biases the support yoke toward the rack bar. The split roller includes a first split roller section and a second split roller section. The first split roller section is substantially conical in shape and has a large diameter side located proximate to one of the bearing surfaces. The first split roller section is rotatably disposed on and axially slidable toward the one of the bearing surfaces and tangentially engages the rack bar. The second split roller section is also substantially conical in shape with a large diameter side located proximate to an other of the bearing surfaces. The second split roller section is rotatably disposed on and axially slidable toward the other of the bearing surfaces and tangentially engages the rack bar. Low friction radial bearings are disposed between the dowel pins and the roller sections. Low friction thrust bearings are axially disposed between the roller sections and the bearing surfaces of the support yoke. The spring acts against the support yoke to press the roller sections against the rack bar, causing the rollers to separate from each other and thereby defining a gap therebetween and pressing the washers against the bearing surfaces of the support yoke.

6 Claims, 2 Drawing Sheets

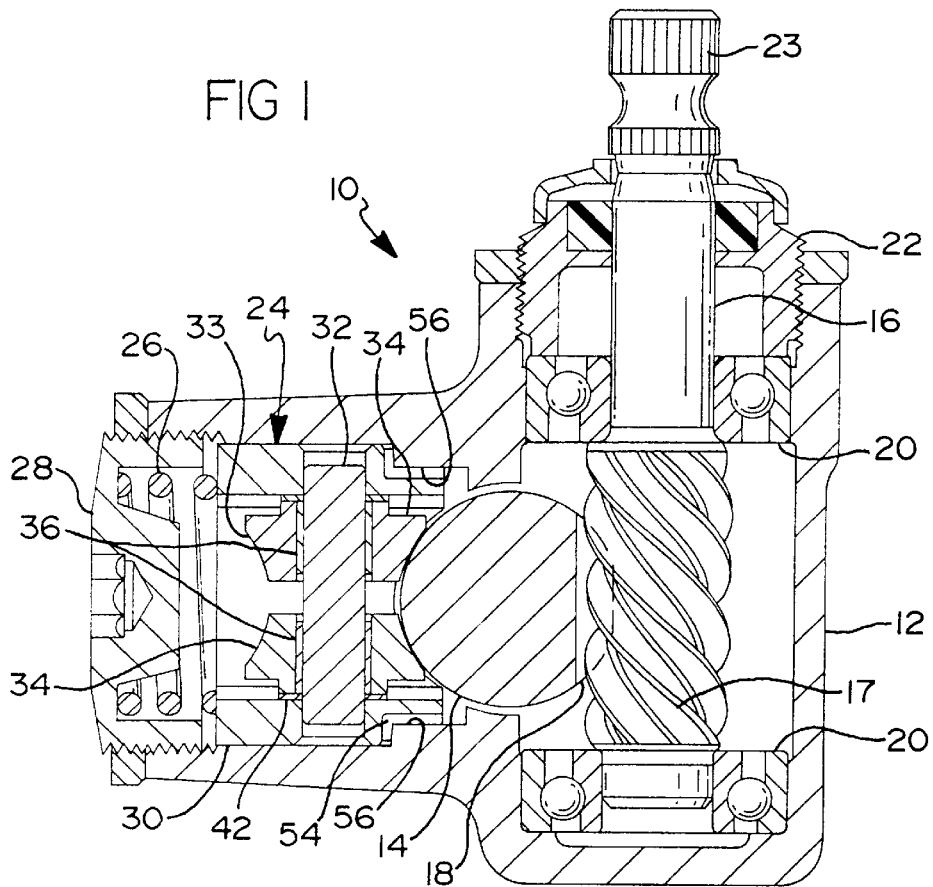
FIG 1
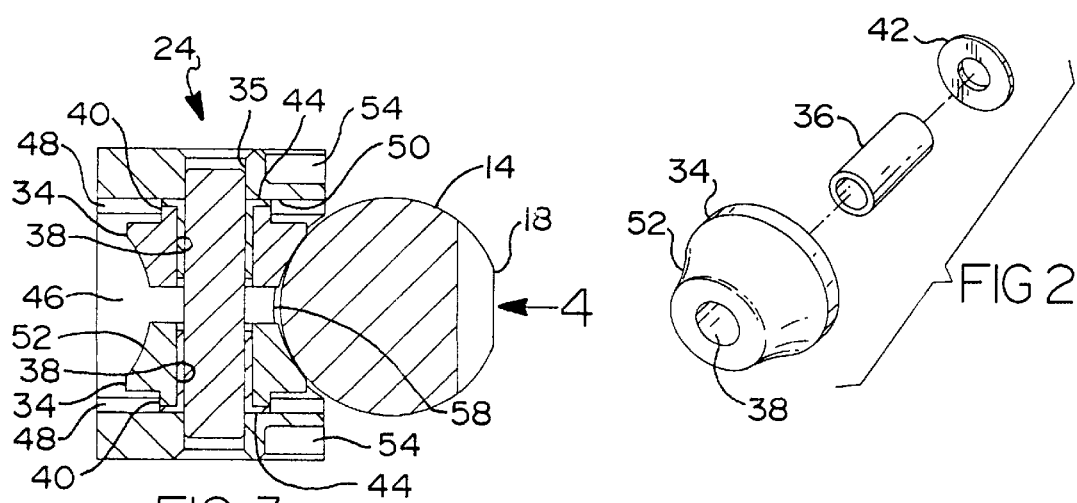
FIG 2
FIG 3

RACK AND PINION STEERING DEVICE WITH SPLIT ROLLER RACK BAR SUPPORT

BACKGROUND OF THE INVENTION

This invention relates to rack and pinion steering devices employing rack bar supports having rollers. In rack and pinion steering gears, a rack bar transverses along its axis when the pinion, which has teeth meshing with the teeth of the rack bar, is turned by the steering wheel and column assembly. Commonly, a support yoke biases the rack bar, toward the pinion to maintain the desired meshing of the rack teeth with the pinion teeth during rotation of the pinion. The support yoke also reacts against shock loads transmitted to the rack bar from bumps in the road via the vehicle wheels, suspension and steering system tie rods.

In light vehicles, such as passenger cars, the rack bar is engaged by a yoke engaging surface complimentary in shape to the section of the rack bar. Friction between the rack bar and the support yoke engaging surface can be reduced by applying low friction surface coatings to the yoke engaging surface. Minimization of friction between the support yoke and the steering rack is an important factor in achieving good steering feel.

Heavier vehicles, such as full sized pick-up trucks and medium duty commercial vehicles, because of their greater mass, have yoke-to-rack bar interface loads of greater magnitude than light vehicles, and consequently have higher associated steering friction loads. One means of reducing the friction load between the rack bar and the yoke support is to locate a roller within the yoke for engagement with the rack bar. Typically, the roller is of a curved profile, complementary in shape to the generally cylindrical rack bar. The roller fits between two walls of the yoke and may have thrust washers disposed between itself and the yoke. Known yoke and roller assemblies, however, are subject to a small amount of fore-aft axial play or movement, as the stack-up tolerances of the assembled components make it extremely difficult to provide a line-to-line fit of the parts. Even a small amount of axial play is undesired as it can be detected by the vehicle operator as an unwanted vibration which may be perceived as an indicator of poor quality. While parts can be made to very close manufacturing tolerances and carefully selected to provide assemblies having little or no axial play, eliminating the play through dimensional control and part selection is expensive. A spring load between each end of the roller and the support yoke can be used to cushion but not eliminate all axial play.

It is desired to provide a steering gear having a low friction rack bar roller support which eliminates the axial play of the roller, is insensitive to slight variations in the roller and yoke components dimensions, and is easy to assemble.

SUMMARY OF THE INVENTION

A steering gear for a motor vehicle includes a housing, a rack bar, a pinion, a support yoke, a spring, a split roller, and a plurality of bearings. The rack bar is slidably supported within the housing for transverse displacement therein along an axis. The rack bar has teeth on a first side. The pinion has teeth drivingly engaging the teeth of the rack bar. The pinion is rotatably supported within the housing. Rotation of the pinion transversely displaces the rack bar along the axis. The support yoke is slidably disposed in the housing for movement toward a side of the rack bar substantially opposite the teeth of the rack bar. The support yoke has an opening which is open toward the rack bar, with the opening defining two opposed bearing thrust surfaces, or simply bearing surfaces. The spring is disposed between the housing and the support yoke, and biases the support yoke toward the rack bar. The split roller includes a first split roller section and a second split roller section. The first split roller section is substantially conical in shape and has a large diameter side located proximate to one of the bearing surfaces. The first split roller section is rotatably disposed on and axially slidable toward the one of the bearing surfaces and tangentially engages the rack bar. The second split roller section is also substantially conical in shape with a large diameter side located proximate to an other of the bearing surfaces. The second split roller section is rotatably disposed on and axially slidable toward the other of the bearing surfaces and tangentially engages the rack bar. Low friction radial bearings are disposed between the dowel pins and the roller sections. Low friction thrust bearings are axially disposed between the roller sections and the bearing surfaces of the support yoke. The spring acts against the support yoke to press the roller sections against the rack bar, causing the rollers to separate from each other and thereby defining a gap therebetween and pressing the washers against the bearing surfaces of the support yoke.

A steering gear with a low-friction rack bar support is disclosed having a yoke mounted split roller which provides the rack bar with low friction support and eliminates axial play of the roller. The split roller is easily assembled into the rack bar support. By eliminating the axial play, the vibrations associated with fore-aft rack movement are eliminated. Sensitivity of the rack bar support to small variations in the dimensions of the yoke and the roller is eliminated.

BRIEF DESCRIPTION OF THE DRAWINGS

FIG. 1 is a sectional view of a rack and pinion steering gear having a split roller support.

FIG. 2 is a perspective view of the roller, a bushing and a washer.

FIG. 3 is a detail of the support assembly and rack bar of FIG. 1, having an integral one piece bushing and washer.

DESCRIPTION OF PREFERRED EMBODIMENTS

Figure 4:
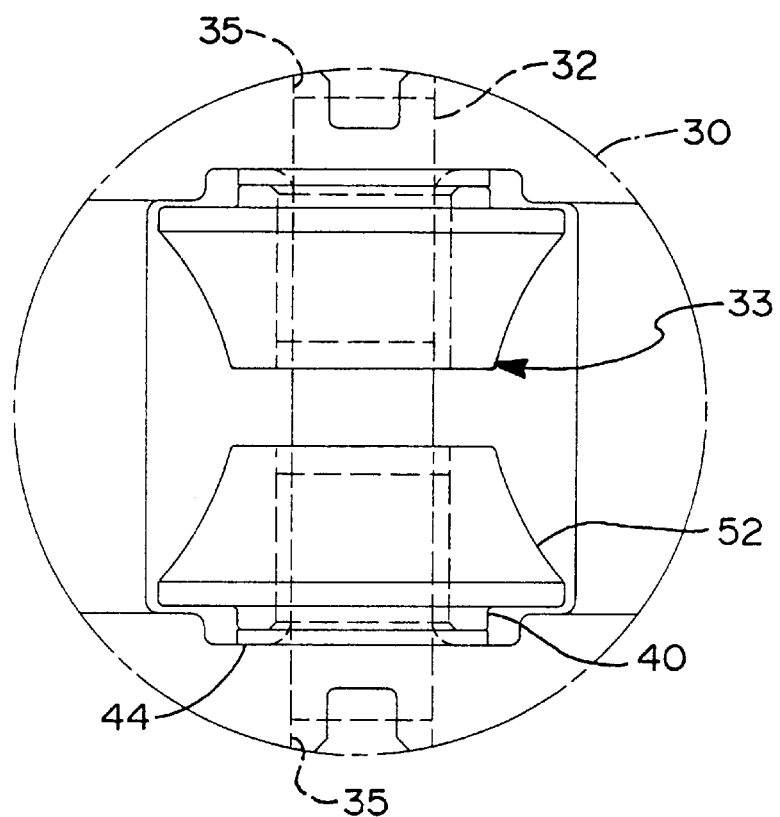
FIG. 4 is an end view of the support assembly of FIG. 3 in the direction of arrow 4.

An exemplary rack and pinion steering gear 10 is shown in section in FIG. 1. A housing 12 encloses and helps support a rack bar 14 and a pinion 16. Pinion 16 has teeth 17 which drivingly engage rack teeth 18 disposed on one side of rack bar 14. Pinion 16 is shown as being supported at two locations by rolling element bearings 20 mounted within housing 12. It should be appreciated that pinion 16 need not necessarily be supported by rolling element bearing but could instead be supported by low friction bushings. A seal assembly 22 is disposed proximate to a splined end 23 of pinion 16. Splined end 23 is drivingly connected to a power steering assist mechanism (not shown) and/or to a steering wheel and column assembly (not shown).

A support assembly 24, best shown in FIG. 3, engages a side of rack bar 14 opposite pinion 16 and rack teeth 18. A compressive coil preload spring 26 biases support assembly 24 into engagement with rack bar 14. Spring 26 is retained by cap 28 which threads onto housing 12. Spring 26 reacts against housing 12 through cap 28. There is a gap between support assembly 24 and the end of cap 28.

Support assembly 24 includes a support yoke 30 which is substantially cylindrical in shape, a transversely disposed dowel pin 32 fixed within support yoke 30 and a split roller 33 comprising a pair of substantially conically shaped split roller sections 34 rotatably mounted on dowel pin 32. Dowel pin 32 is press fit into at least one of axially aligned bores 35 in which it is disposed. The large diameter ends of roller sections 34 are both disposed outboard or distal to each other. Both split roller sections 34 tangentially engage rack bar 14. A bushing 36 formed of three layer low friction material is disposed within a bore 38 of roller 34. Bore 38 is sized to receive bushings 36, best shown in FIG. 2, in a press-fit relation for unitary rotation therewith. Rollers 34 each have a protruding thrust shoulder 40 disposed toward support yoke 30. Shoulder 40 is optional and is employed here primarily to provide a shape complementary to that of yoke 30. A washer 42, also formed of the three layer low friction material, is disposed between shoulder 40 and yoke 30. Bushing 36 and washers serve as radial load bearings and thrust load bearings respectively. The three layer material includes a steel strip as a first layer, a sintered bronze coating as a second layer and a coating of Polytetra Fluoro Ethylene (PTFE) as a third layer. Such material is well known and is commercially available from a number of sources. Bushings and washers made of the described material are available from Oiles America Corporation, the assignee of the present invention. One exemplary bushing is Oiles No. LFB-0910. One exemplary washer material is Oiles No. 800LF. It should be appreciated that other bushings and washers of different sizes and types may be used within the scope of the present invention. As well, alternative low friction materials could be employed such as low friction plastic, or self lubricating plastic. In one preferred embodiment, as shown in FIGS. 3 and 4, bushing 36 and washer 42 are integrated into a unitary single piece flanged bushing 44, preferably formed of the same three layer low friction material. An exemplary flanged bushing is Oiles No. LFF-0910.

A substantially rectangular opening or through-passage 46 passes through support yoke 30 in a direction substantially perpendicular to both rack bar 14 and dowel pin 32. It should be appreciated that the shape of opening 46 can be varied. For example, it could be flat on just 2 sides. That opening 46 is a through-passage is not a feature critical to the operation of the invention, but it does facilitate the manufacture of support yoke 30. Oppositely disposed bearing channels 48 extend along opposite sides of passage 46. In the disclosed embodiment, bearing channels 48 define a pair of oppositely disposed bearing surfaces 50. The provision of channels 48 is a design choice relating to the structural integrity of support yoke 30. The invention would work equally well with no shoulder.

The use of flanged bushings is particularly advantageous in that assembly of support assembly 24 is greatly facilitated. To assemble support assembly 24 when washers 42 are used requires the alignment of two washers and two roller sections, positioning washer 42 and roller sections 34 between bearing surfaces in alignment with the bores 35, and maintaining the alignment while pressing pin 32 into bores 35 to capture washers 42 and roller sections 34. Special handling problems are also presented by the washers because they are relative thin, making them more difficult to retain and manipulate into an aligned position. Further, washers should preferably be properly oriented, with the PTFE coating oriented toward engagement surface 50. These assembly concerns are reduced or eliminated with the use of a flanged bushing. The number of parts which must be aligned is cut in half, and concerns with handling and orienting washers are eliminated.

Roller sections 34 are substantially disposed within opening 46. Dowel pin 32 extends between bearing surfaces 50. The diameter of thrust shoulder 40 provides clearance with respect to channels 48. The depth of both channels 48 is less than the combined thickness of washer 42 and shoulder 40, or the combined thickness of flange of bushing 44 and shoulder 40. The described channel depth prevents the outer diameter portion of roller section 34 from engaging yoke 30. Roller sections 34 having a roller surface 52 with a concave profile which is complimentary to the cross sectional shape of rack bar 14. The radius of the profile of roller sections 34 is slightly larger than the radius of rack bar 14. The resultant single point contact enables control over where contact between the parts occurs. Roller sections 34 and rack bar 14 must be of a specific hardness. Roller sections 34 need to be harder than rack bar 14 to prevent roller sections from breaking down. Over time, with deformation of the rack bar and/or of the rollers, the area of contact may expand or smear.

Support yoke 30 has a pair of oppositely disposed notches 54 which receive radially inwardly projecting alignment features 56 of housing 12. Notches 54 and alignment features 56 assure the correct orientation of support assembly 24 during its installation and maintain support assembly 24 in the desired orientation during the assembly of steering gear 10. The provision of notches 54 and alignment features 56 is a design choice not critical to the functioning of the invention. If alignment features 56 are not provided, and there is sufficient radial clearance between housing 12 and yoke 30, support yoke 30 will spontaneously rotate to the desired alignment position as a result of the reaction of roller sections 34 against rack bar 14. Support yoke 30 also has a clearance arch 58 of sufficient size to ensure that the only contact rack bar 14 has with support assembly 24 is with roller sections 34.

The advantages of the split roller are better understood in light of the operation of steering gear 10 into which the split roller is integrated. The operation of the rack and pinion steering gear 10 will now be described to better illustrate the advantages of the split roller.

Pinion 16 is selectively rotated by a vehicle operator rotating a steering wheel which is connected to pinion 16 via a power steering assist unit (not shown) and/or a steering column (not shown). Driving engagement between the pinion teeth 17 and rack teeth 18 transversely displaces rack bar 14 along its axis. Roller sections 34 rotate about pin 32 as rack bar 14 is displaced. But, the driving engagement between pinion teeth 17 and rack teeth 18 also develops a separating force tending to cause rack bar 14 and pinion 16 to move away from each other. Suspension loads transmitted through the tie rods are an additional source of forces tending to move rack bar 14 away from pinion 16.

Rolling element bearings 20 resist the separation force on the pinion and maintain the position of pinion 16.

Figure 5:
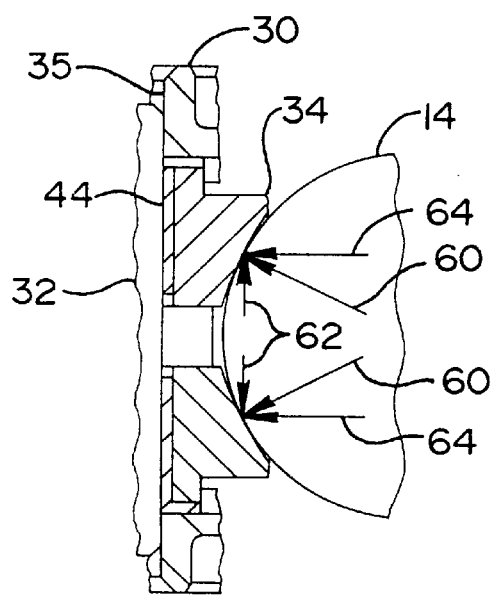
FIG. 5 is an enlarged, broken-out portion of the support assembly and rack bar of FIG. 3.

Spring 26, acting against support assembly 24, aids rack bar 14 in resisting forces tending to displace rack bar 14 away from pinion 16. Roller sections 34 are forced against rack bar 14. The reactive forces of rack bar 14 against roller sections 34 can be approximated as force vectors 60, shown in FIG. 5. Oppositely oriented outwardly directed force vector portions 62 bias roller sections 34 against bearing surfaces 50 and keep roller sections 34 pressed toward bearing surfaces 50. The outwardly directed vector forces 62 prevent any separation between roller sections 34 and bearing surfaces 50 and therefore prevent the generation of mechanical vibration by the reengagement of roller sections with bearing surfaces 50.

A fore-aft directed force input into the rack bar 14, which one might expect when one of the wheels hits a bump or a pothole, tends to move rack bar 14 within housing 12 in a direction parallel to dowel pin 32. With a one piece roller, this would generate the undesired vibrations within steering gear 10. But, in steering gear 10 with split roller 33, there is no such generation of vibrations because roller sections 34 are always pressed against bearing surfaces 50 by forces 62. The rigid character of support yoke 30 further limits the movement of rack bar 14 away from pinion 16 by limiting the outward movement of roller sections 34. Thus, fore-aft suspension loads on rack bar 14 will not result in any fore-aft movement of rack bar 14, an appreciable improvement over known means of limiting fore-aft movement of rack bar 14.

The flange portions of bushings 44, or washers 42, with their low friction characteristics, protect both bearing surfaces 50 and thrust surfaces of shoulders 40 from being damaged by the combination of the loading between the parts and the relative rotation therebetween. Portions of bushings 44 disposed within bores 38, or bushings 36, each sustain radial loads corresponding to a portion 64 of force vectors 60 normal to pin 32, approximately equaling one half the force applied by spring 26.

We claim:

1. A steering gear for a motor vehicle comprising:
   a housing;
   a rack bar slidably supported within the housing for transverse displacement therein along an axis and the rack bar having teeth on a first side;
   a pinion having teeth drivingly engaging the teeth of the rack bar and the pinion being rotatably supported within the housing wherein rotation of the pinion transversely displaces the rack bar along the axis;
   a support yoke slidably disposed in the housing for movement toward a side of the rack bar substantially opposite the teeth of the rack bar and the support yoke having an opening open toward the rack bar with the opening defining two opposed bearing surfaces;
   a spring disposed between the housing and the support yoke biasing the support yoke toward the rack bar;
   a split roller including
      a first split roller section substantially conical in shape having a large diameter side located proximate to a one of the bearing surfaces and the first split roller section rotatably disposed on the one of the bearing surfaces and tangentially engaging the rack bar,
      a second split roller section substantially conical in shape having a large diameter side located proximate to an other of the bearing surfaces and the second split roller section rotatably disposed on the other of the bearing surfaces and tangentially engaging the rack bar;
   low friction radial bearings disposed within a bore formed in each of the roller sections; and
   low friction thrust bearings axially disposed between the roller sections and the bearing surfaces of the support yoke
   wherein the spring acts against the support yoke to press the split roller against the rack bar and causes the roller sections of the split roller to separate from each other defining a gap therebetween and pressing the thrust bearings against the bearing surfaces of the support yoke.

2. A steering gear for a motor vehicle as claimed in claim 1, wherein the radial bearing is a low friction bushing.

3. A steering gear for a motor vehicle as claimed in claim 1, wherein the thrust bearing is a low friction washer.

4. A steering gear for a motor vehicle as claimed in claim 1, wherein the radial bearing and the thrust bearing associated with each of the split roller sections are defined by a unitary one piece low friction flanged bushing.

5. A steering gear for a motor vehicle as claimed in claim 1, wherein both of the split roller sections have a concave profile complimentary to a cross section of the rack bar.

6. A steering gear for a motor vehicle comprising
   a housing;
   a rack bar slidably supported within the housing for transverse displacement therein along an axis and the rack bar having teeth on a first side;
   a pinion having teeth drivingly engaging the teeth of the rack bar and the pinion being rotatably supported within the housing wherein rotation of the pinion transversely displaces the rack bar along the axis;
   a support yoke slidably disposed in the housing for movement toward a side of the rack bar substantially opposite the teeth of the rack bar and the support yoke having an opening open toward the rack bar with the opening defining two opposed bearing surfaces;
   a spring disposed between the housing and the support yoke biasing the support yoke toward the rack bar;
   a dowel pin fixed to and rigidly supported by the support yoke and the dowel pin extending across the central opening between the bearing surfaces substantially perpendicular to the rack bar;
   a split roller including
      a first split roller section substantially conical in shape having a large diameter side located proximate to a one of the bearing surfaces and the first split roller section rotatably and axially slidably disposed on the dowel pin and tangentially engaging the rack bar,
      a second split roller section substantially conical in shape having a large diameter side located proximate to an other of the bearing surfaces and the second split roller section rotatably and axially slidably disposed on the dowel pin and tangentially engaging the rack bar; and
   low friction flanged bushings disposed in part in an axial bore of each split roller section and the flanged portion being disposed on the large diameter side of each split roller section
   wherein the spring acts against the support yoke to press the split roller against the rack bar and causes the roller sections to separate from each other defining a gap therebetween and presses the flanged portions against the bearing surfaces of the support yoke.

* * * * *